April 1, 1952  D. E. GILLESPIE  2,591,420
CULTIVATOR
Filed Feb. 3, 1949
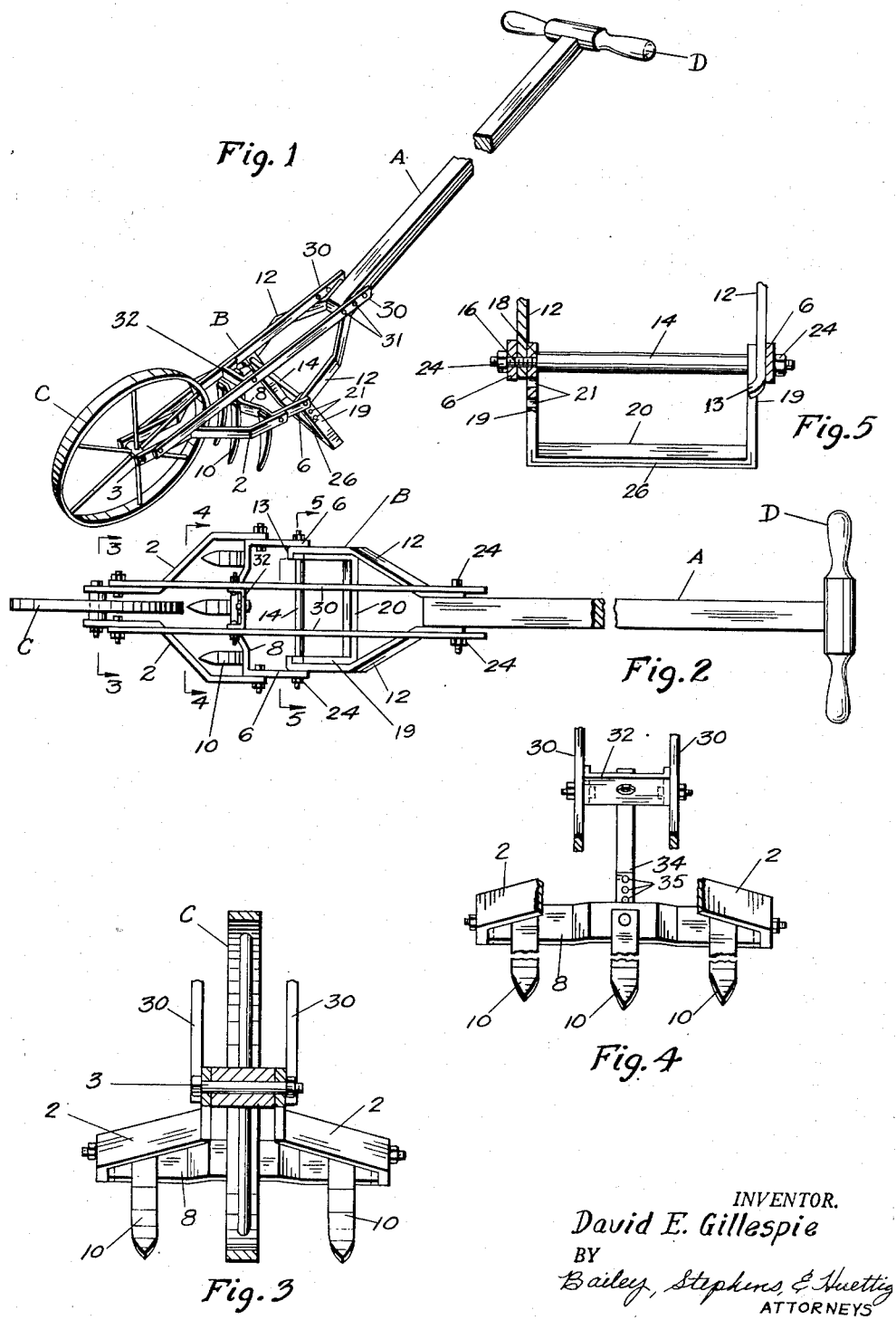
INVENTOR.
David E. Gillespie
BY
Bailey, Stephens & Huettig
ATTORNEYS Patented Apr. 1, 1952

2,591,420

UNITED STATES PATENT OFFICE 2,591,420

CULTIVATOR

David E. Gillespie, David City, Nebr.

Application February 3, 1949, Serial No. 74,337

7 Claims. (Cl. 97—59)

This invention is directed to a combined cultivator and weed cutter. In particular the invention is directed to a hand operated cultivator and cutter for garden use.

An object of the invention is to produce a rugged combined cultivator and weed cutter of simple and lightweight construction. Further objects of the invention are to produce a cultivator and cutter which will cut off or scrape off any weeds which are not turned out of the ground by the cultivator teeth, and to produce such an apparatus in which the handle and the height of the cutter can be adjusted with respect to the cultivator teeth.

In general these objects are obtained by constructing a truss frame of parts which also form supports for the cultivator teeth and the cutter bar, said frame being supported at one end by a wheel, and having one side extended into a pusher handle. The cultivator teeth are located behind the wheel and in front of the cutter so that the ground is first worked by the teeth, and deep rooted weeds which are not dislocated by the teeth will be caught and cut off by the cutter. Both the handle and cutter are independently adjustable to meet the size of a person pushing the cultivator, so that when the teeth are pushed through the ground, the cutting edge of the cutter is horizontal.

The means by which the objects of the invention are obtained are more fully described with reference to the drawing, in which:

Fig. 1 is a perspective view of the cultivator;

Fig. 2 is a top plan view of the cultivator;

Fig. 3 is an enlarged cross-sectional view on the line 3—3, Fig. 2;

Fig. 4 is an enlarged cross-sectional view on the line 4—4, Fig. 2; and

Fig. 5 is an enlarged cross-sectional view on the line 5—5, Fig. 2.

As seen in Fig. 1 the cultivator is composed of a handle A, a truss frame B and a wheel C. The two sides of frame B are symmetrical.

The base of the truss frame is composed of a pair of Z-shaped members 2, the forward ends of which are journalled to the axle shaft 3 of wheel C, and the rear ends of which are joined, as by bolts, to the legs 6 of a U-shaped member. The bight 8 of this member extends across the frame and carries the depending cultivator teeth 10.

The free ends of legs 6 are joined to a second pair of Z-shaped members 12 which form the rear sides of the truss frame. The lower ends of members 12 terminate in inwardly turned flanges 13. Legs 6 and members 12 are crossconnected by rod 14 which has reduced threaded ends 16, Fig. 5, forming shoulders 18. The legs 19 of U-shaped cutter 20 have three pairs of apertures 21 through which a pair of the threaded ends 16 extend, and the legs abut shoulders 18. The vertical height of cutter 20 can be adjusted by removing the bolt connecting members 2 and 6 on one side of the cultivator, then removing nuts 24, members 6, 12 and 19 from shaft 14, resetting shaft 14 into another pair of holes 21, and then replacing the members on shaft 14 and tightening nuts 24 and replacing the bolt in members 2 and 6. Members 2, 6, 12 and 19 are sufficiently resilient to make this possible. As legs 19 bear upon flanges 13, the legs are prevented from rotating on shaft 14. The forward edge 26 of cutter 20 may be sharpened to a knife edge.

Truss frame B is completed by a pair of members 30 forming the upper sides of the truss. The upper ends of members 30 are secured to the upper ends of members 12 by a bolt which also secures the members to the lower end of handle A. Members 30 are provided with three pairs of holes 31 adjacent their upper ends so that handle A can be, in effect, angularly adjusted with respect to the plane of members 2. The lower ends of members 30 are secured, respectively, to Z-shaped members 2, slightly rearwardly of axle shaft 3. Above bight 8 is a crossbrace 32 extending between members 30, and a strap 34 connects brace 32 to bight 8. This strap has four holes 35 adjacent its lower end to enable its length being altered in accordance with the fastening of members 30 to handle A.

Frame B is lightweight but rigid by reason of the transverse and vertical crossbracing. When in operation, the greatest stress is upon teeth 10, and this stress is transmitted to upper frame members 30 as well as to side members 2. The assembly is simple and compact, and the various pieces are conveniently connected by bolts and nuts.

Before the cultivator is put into use, the angle of handle A is adjusted to the set of holes 31 to bring the height of the handhold D at a height above the ground most convenient to the operator of the cultivator. At the same time an adjustment must be made of the strap 34 where it is attached to bight 8. Finally, legs 19 of cutter 20 are set in the pair of holes 21 which will, for the position of the handle selected, cause edge 26 of the cutter to move substantially parallel to the ground when handholds D are depressed to push teeth 10 into the ground as the cultivator is moved forwardly, truss B rotating on shaft 3. Weeds not turned out of the ground by teeth 10 will then be cut off, or scraped off by edge 26 and effectively destroyed. The location of the cutter with respect to the teeth makes it possible for the operator of the cultivator to depress handle A but slightly so that teeth 10 penetrate the ground only a small distance, and edge 26 is kept above the ground, when areas having no weeds are being cultivated. When a weedy area is encountered, handle A is further depressed, sinking teeth 10 deeper into the ground and causing cutter 20 to function at the surface, or slightly below the ground surface, to cut the weeds and their roots. This greatly reduces the amount of work required to cultivate a given area, and increases the speed of cultivating. It is further noted that by reason of the compact structure of frame B, the cultivator, when not in use, can be towed from place to place by turning frame B upside down, thus preventing the teeth and cutter from engaging any obstructions.

Having now described the means by which the objects of the invention are obtained, I claim:

1. In a hand cultivator having a wheel, a wheel shaft, a frame for supporting cultivator teeth and a handle, said frame comprising a first pair of oppositely disposed Z-shaped members having one of their ends journalled upon said shaft, a U-shaped member the bight of which extends transversely and cross-connects said Z-shaped members and the legs of which comprise extensions of said Z-shaped members, a second pair of Z-shaped members connecting said legs to said handle, and a pair of members connecting said handle to said first named Z-shaped members adjacent said shaft.

2. In a hand cultivator as in claim 1, a cutter, and means mounting said cutter comprising a rod extending transversely of said frame, and means adjustably mounting said cutter upon said rod.

3. In a hand cultivator as in claim 2, cultivator teeth depending from said U-shaped member.

4. In a hand cultivator as in claim 3, a brace extending between said pair of members connecting said handle to said first pair of Z-shaped members, and a strap connecting said brace with said bight.

5. In a hand cultivator as in claim 1, means for adjustably connecting said handle connecting members to said handle to vary the angle between said handle and the plane of said first pair of Z-shaped members.

6. In a hand cultivator as in claim 5, a brace extending between said pair of members connecting said handle to said first pair of Z-shaped members, and a strap adjustably connecting said brace with said bight.

7. In a hand cultivator as in claim 1, a cutter, a rod extending transversely of said frame, inwardly turned flanges on the lower ends of said second pair of Z-shaped members, and means mounting said cutter upon said rod and bearing against said flanges.

DAVID E. GILLESPIE.

REFERENCES CITED

The following references are of record in the file of this patent:

UNITED STATES PATENTS

| Number | Name | Date |
|---|---|---|
| 1,003,481 | Magoon | Sept. 19, 1911 |
| 1,280,866 | Schaible | Oct. 8, 1918 |
| 1,917,333 | Simmons | July 11, 1933 |
| 2,506,033 | Mondloch | May 2, 1950 |